United States Patent [19]

Becker et al.

[11] 4,235,606
[45] Nov. 25, 1980

[54] SEPARATION OF GASEOUS OR VAPOROUS SUBSTANCES ACCORDING TO THE SEPARATING NOZZLE PRINCIPLE

[75] Inventors: Erwin-Willy Becker, Karlsruhe; Peter Bley, Eggenstein-Leopoldshafen; Wolfgang Ehrfeld; Ursula Ehrfeld, both of Ettlingen; Gunther Krieg, Karlsruhe, all of Fed. Rep. of Germany

[73] Assignee: Kernforschungszentrum Karlsruhe GmbH, Karlsruhe, Fed. Rep. of Germany

[21] Appl. No.: 4,217

[22] Filed: Jan. 17, 1979

[30] Foreign Application Priority Data

Jan. 17, 1978 [DE] Fed. Rep. of Germany ....... 2801923

[51] Int. Cl.$^2$ ............................................. B01D 59/18
[52] U.S. Cl. .......................................... 55/17; 55/277
[58] Field of Search .................................... 55/17, 277

[56] References Cited

U.S. PATENT DOCUMENTS 3,362,131  1/1968  Becker ..................................... 55/17

FOREIGN PATENT DOCUMENTS 771476  11/1967  Canada ......................................... 55/17
1052955  3/1959  Fed. Rep. of Germany .............. 55/17
1061296  7/1959  Fed. Rep. of Germany .............. 55/17
1096875  7/1961  Fed. Rep. of Germany .............. 55/17

Primary Examiner—Robert H. Spitzer
Attorney, Agent, or Firm—Spencer & Kaye

[57] ABSTRACT

In a method for separating a gaseous or vaporous mixture into components having different molecular weights and/or different gas kinetically effective cross sections by conducting the mixture through a nozzle into a separating chamber and deflecting the mixture in the chamber by mutual jet deflection, dividing the deflected mixture into partial streams having respectively different compositions by means of at least one separating baffle which protrudes into the mixture flow path, and separately removing the partial streams, the mixture is conducted through the nozzle by being distributed substantially uniformly around the axis of the separating chamber by being fed into the chamber from all sides thereof in radial directions along a plane, and the partial streams are removed by causing at least the lightest partial stream to flow radially out of the separating chamber substantially uniformly around the axis of the separating chamber and in a plane approximately parallel with the plane along which the mixture is fed into the separating chamber. Apparatus for performing the method is composed of four aligned discs provided with mutually aligned bores delimiting the separating chamber, the two interior discs delimiting the nozzle and the two exterior discs defining separating baffles.

12 Claims, 11 Drawing Figures

SEPARATION OF GASEOUS OR VAPOROUS SUBSTANCES ACCORDING TO THE SEPARATING NOZZLE PRINCIPLE

BACKGROUND OF THE INVENTION

The present invention relates to a method and apparatus for separating gaseous or vaporous substances having different molecular weights and/or different gas kinetically effective cross sections, wherein the mixture to be separated is conducted through a nozzle into a separating chamber where it is deflected, whereupon one or a plurality of separating baffles, which protrude into the flow path, collect partial streams of different compositions which are then discharged separately.

The principle of the separating nozzle method is disclosed in German Pat. No. 1,052,955 and is based on the partial spatial separation of a jet expanding from a nozzle-like opening into a chamber at subatmospheric pressure. German Pat. Nos. 1,096,875 and 1,198,328 show that the economy of a process for separating isotopes of heavy elements can be improved by the use of a light additive gas.

From theoretical investigations and experimental tests, it is known that a high separating effect can be realized only if the velocity ratio is as high as possible and at the same time the deflection angle of the flow lines of the jet is as large as possible. The velocity ratio is the ratio of flow velocity to most probable thermal velocity. The most probable thermal velocity c is defined by the equation $$c = \sqrt{2 k T/m}$$

where k is the Boltemann constant, T is the absolute temperature and m is the molecular weight.

SUMMARY OF THE INVENTION

It is therefore an object of the present invention to improve the economy of operation of the basic process by improving the above-mentioned combination of deflection angle and velocity ratio while maintaining an expansion ratio which is as small as possible, the expansion ratio being the ratio of the pressure of the inflowing mixture to the pressure in any one of the extracted partial streams.

These and other objects are achieved, according to the invention, in a method for separating a gaseous or vaporous mixture into components having different molecular weights and/or different gas kinetically effective cross sections by conducting the mixture through a nozzle into a separating chamber and deflecting the mixture in the chamber by mutual jet deflection, dividing the deflected mixture into partial streams having respectively different densities by means of at least one separating baffle which protrudes into the mixture flow path, and separately removing the partial streams, by carrying out the step of conducting in such a manner as to distribute the mixture substantially uniformly around the axis of the separating chamber and feed the mixture into the chamber from all sides thereof in radial directions along a plane, and by carrying out the step of removing so as to cause at least the lightest partial stream to flow radially out of the separating chamber substantially uniformly around the axis of the separating chamber and in a plane approximately parallel with the plane along which the mixture is fed into the separating chamber.

The objects according to the invention are further achieved by the provision of apparatus for carrying out the above method and composed of at least one nozzle element constituted by four aligned discs spaced from one another and each provided with a bore for passage of the mixture stream, the bores in the discs being in mutual alignment and delimiting the separating chamber. In this apparatus, the two interior discs delimit the nozzle and the two exterior discs define separating baffles.

By bringing the mixture radially from all directions into the separating chamber, i.e. by generating a sort of sink flow in the plane of the envelope of the inward flow with radially converging flow lines, there is formed a strong, axially symmetrical compression, or contraction, of the jet. According to the invention, the partial streams to be extracted, which have already been subjected to separation, are at least in part discharged radially outwardly in a sort of source flow. There then occurs the advantage of greater deflection for these partial streams so that the total deflection of these partial streams can be increased to practically 180°.

Due to the favorable inflow and outflow conditions existing in the sink flow and source flow streams, respectively, it is possible to operate with comparatively small expansion ratios. For example, very favorable separating conditions are already realized if the separately extracted partial streams are expanded by less than a factor of two compared to the inflowing mixture.

It has been found that the extraction pressure of the heaviest partial streams, relative to the pressure of the inflowing gas, can be selected to be particularly high whenever the heaviest partial streams of the axially symmetrical streams flowing away from different axially spaced nozzle elements are directed axially toward one another in such a manner that they deflect one another in an axially symmetrical manner and flow out together in all radial directions and approximately parallel to the inflow plane. Under economically feasible operating conditions, the heavy partial streams are generally extracted at higher pressures than the light partial streams. The small flow losses to bring the heaviest partial streams to pressures which are equal to or even greater than the pressure at which the mixture to be separated is introduced into the separating chamber, which may result in the elimination of separate compressors for the heaviest fractions in cascade arrangements.

The method on which the present invention is based, according to which the mixture to be separated is introduced in the form of a sink stream and the separated fractions are removed in the form of source streams, additionally offers the opportunity of dividing the mixture subjected to the separating process into more than two partial streams and of separately extracting these partial streams without imposing any space requirements so that the economic success of this technique is not endangered by flow losses. Moreover, the partial streams can be subjected to a subsequent separation by introduction of parts of a heavy partial stream into an adjacent light partial stream.

As in prior art versions of the separating nozzle method, the separating effect can be increased, particularly in connection with the separation of mixtures having a high average molecular weight, by adding a lighter additive gas preferably with a large molar excess.

Under optimum operating conditions for uranium isotope separation one uses a feed gas consisting of 90 to 99 mole % hydrogen and 10 to 1 mole % uranium hexafluoride.

DESCRIPTION OF THE PREFERRED EMBODIMENTS

Figure 1:
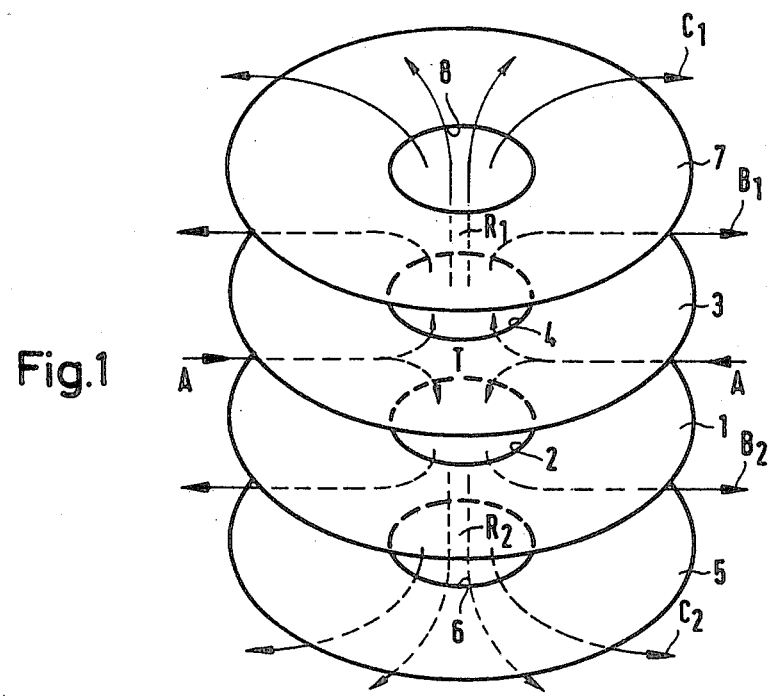
FIG. 1 is a simplified pictorial perspective view of the basic components of apparatus according to the invention composed of a plurality of superposed, spaced, centrally perforated discs.

The basic configuration shown in FIG. 1, which constitutes a unit identified herein as an annular gap nozzle element, includes four coaxially aligned, axially spaced perforated discs 1, 3, 5 and 7 having central bores 2, 4, 6 and 8, respectively. Along the axis of this nozzle element there is provided a separating chamber T in the form of a cylinder whose cylindrical side wall contains the edges of bores 2, 4, 6 and 8 and whose axial end faces are delimited by the planes of bores 6 and 8. An annular inflow nozzle is defined between discs 1 and 3, while discs 5 and 7 constitute separating baffles protruding into the flow path of the substance whose components are to be separated.

A mixture A of such substance, which is introduced radially from all directions about the axis of the nozzle element in a uniform manner, flows in radially converging flow lines toward the center of the separating chamber T, where it is deflected in opposite axial directions towards bores 2 and 4 so as to flow through them in the form of respective axially symmetrical jets $R_1$ and $R_2$. The lighter components of the mixture are deflected more than the heavier ones, which is in accordance with the desired demixing.

In the region where the flow lines of the two axially symmetrical jets $R_1$ and $R_2$ diverge, the jets are divided into two pairs of partial streams by means of discs, or baffles, 7 and 5, the jet which flows through bore 4 being divided into a lighter partial stream $B_1$, which is extracted between discs 3 and 7 and a heavier partial stream $C_1$, which is extracted through bore 8 and the jet which flows through bore 2 being divided into a lighter partial stream $B_2$ which is extracted between discs 1 and 5 and a heavier partial stream $C_2$ which is extracted through bore 6.

Figure 2:
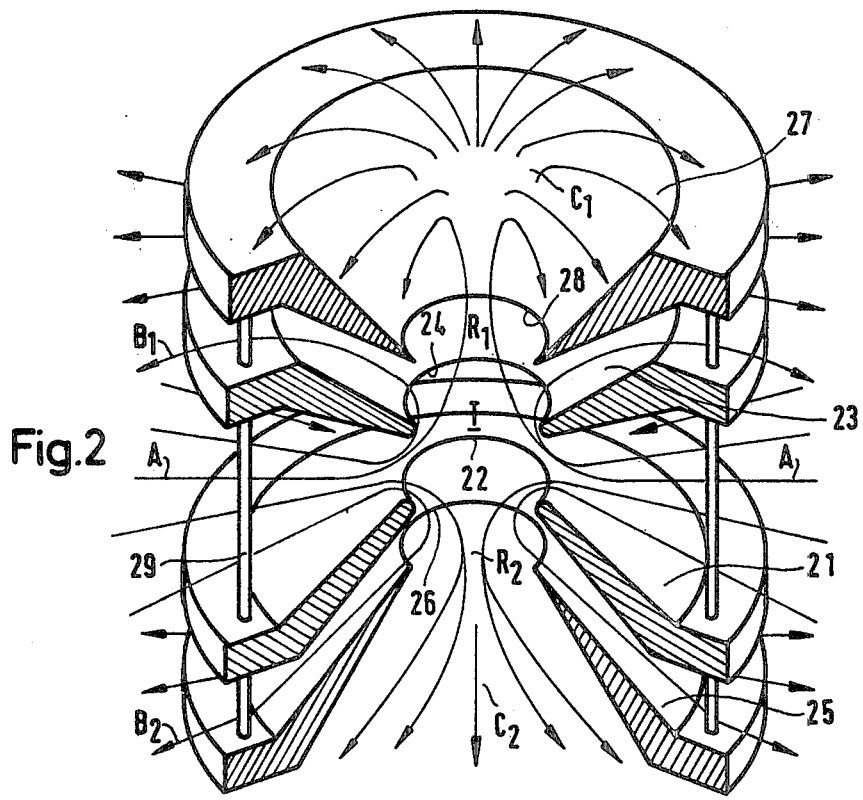
FIG. 2 is a cross-sectional view of a system according to the invention having a configuration similar to that of FIG. 1, but with perforated discs having frustoconical surfaces.

In a modified form of construction of the annular gap nozzle element of FIG. 1, as shown in FIG. 2, perforated discs 21, 23, 25 and 27 each have a frustoconical form and are arranged so that their small diameter ends, directed toward the tops of the corresponding cones, point toward the interior of separating chamber T. The perforated discs 21 and 23 may be rounded at their frontal, or interior, edges 22 and 24, respectively, or can even be provided there with beads, while the frontal, or interior, edges 26 and 28 of the perforated discs 25 and 27, respectively, which serve as separating baffles are usually given sharper edges. Edges 22, 24, 26 and 28 define bores corresponding to bores 2, 4, 6 and 8 of FIG. 1, while discs 21, 23, 25 and 27 correspond to discs 1, 3, 5 and 7 of FIG. 1. In the embodiment of FIG. 1, the disc edges defining bores 2, 4, 6 and 8 can be given the forms described above with reference to corresponding edges 22, 24, 26 and 28.

As can also be seen in FIGS. 1 and 2, the light partial streams $B_1$ and $B_2$ are extracted out of the separating chamber in all radial directions and approximately parallel to the flow lines of A.

FIG. 2 shows by way of an example one manner in which the discs 21, 23, 25 and 27 can be held the proper distance apart by, for example, three spacers 29.

As already mentioned above, it is possible to extract the heavier partial streams $C_1$ and $C_2$ at higher extraction pressures than the lighter partial streams $B_1$ and $B_2$. These heavier partial streams can even be stopped back to pressures which are equal to or greater than the pressure at which the mixture to be separated is brought into the annular gap nozzle element, when the mixture consisting of components of high molecular weight is diluted by a light additive gas. In this case, the heavy mixture is accelerated by the light gas and the kinetic energy of the molecules of the heavy mixture is enhanced. Since the heavy molecules and, hence, the kinetic energy are concentrated in the heavier partial streams, the dynamic pressure of these streams can exceed the inlet pressure and, correspondingly, the static pressure of the heavier streams can increased over the inlet pressure by pressure recovery.

Thus, the heavier partial streams $C_1$, $C_2$ can be introduced in cascade into a further separating stage without intermediate compression.

Figure 3:
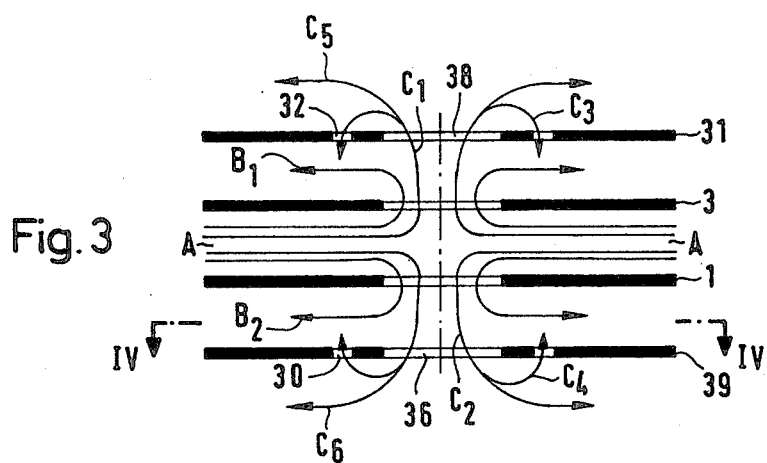
FIG. 3 is a schematic, longitudinal, axial, cross-sectional view of a modified form of construction of the perforated disc configuration of FIG. 1, for subjecting the heavy partial streams to a subsequent separation.
Figure 4:
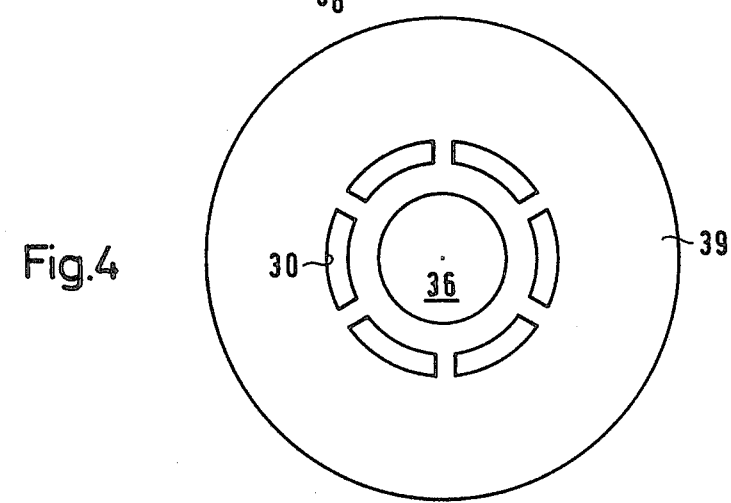
FIG. 4 is a cross-sectional view taken along the line IV—IV of FIG. 3.

Moreover, the pressure difference between the partial streams $C_1$, $C_2$ and the partial streams $B_1$, $B_2$ can be utilized to subject the partial streams $C_1$, $C_2$ to a supplemental separation. A particularly simple structure for achieving this is shown in FIGS. 3 and 4. Here recesses 30 and 32 are provided in the separating baffles 31 and 39 near the respective central openings 36 and 38, baffles 31 and 39 corresponding to discs 7 and 5, respectively, of FIG. 1. As a result of the lower pressure of the lighter partial stream $B_1$ or $B_2$, respectively, a part $C_3$ or $C_4$, respectively, is branched off from the heavy partial stream $C_1$ or $C_2$, respectively, and is extracted through slits 32 or 30, respectively, together with the light partial stream, $B_1$ or $B_2$, respectively. The flow lines of $C_3$ and $C_4$ are here curved considerably thus producing a further centrifugal field so as to cause a supplemental separation of the heavier partial stream $C_1$ or $C_2$ into streams $C_3$ and $C_5$ or $C_4$ and $C_6$, respectively. Otherwise, the structure shown in FIGS. 3 and 4 corresponds to that of FIG. 1.

Figure 5:
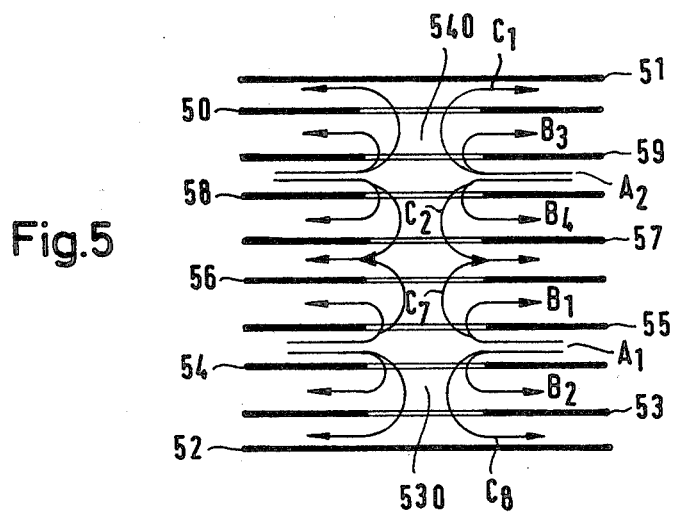
FIG. 5 is a view similar to that of FIG. 3 showing two interconnected basic configurations according to FIG. 1.

FIG. 5 shows an arrangement of two annular gap nozzle elements which are stacked coaxially on top of one another while spaced axially apart. The first system is formed by discs 52, 53, 54, 55 and 56, which define a separating chamber 530, the second system by discs 57, 58, 59, 50 and 51, which define a separating chamber 540. The inlet areas for inflow streams $A_1$ and $A_2$ of the mixture to be separated lie between discs 54 and 55 and between discs 58 and 59, respectively. A first heavy partial stream $C_7$ which flows out of separating chamber 530 of the first-mentioned separating nozzle system through the bore in disc 56 and the heavy partial stream $C_2$ which flows out of the separating chamber 540 of the second separating nozzle system, through the bore in disc 57, are oriented axially toward one another and thus deflect one another radially. The heavier partial streams $C_8$ and $C_1$ which flow out of the bores in discs 53 and 50, can either be deflected by discs 52 and 51, respectively, or such deflections can be effected by corresponding heavy partial streams from further annular gap nozzle elements arranged coaxially with the elements shown in FIG. 5 for the purpose of providing mutual deflection.

The optimum operating pressure is determined by the characteristic dimensions, such as, for example, the diameter of the bores 2 and 4 or the distances between discs 1 and 3 in the region of the bores 2 and 4 in FIG. 1, or the corresponding dimensions of the embodiments of FIGS. 2-5. This can easily be determined empirically. The applicable rule is that the smaller the characteristic dimensions, the higher the optimum operating pressure.

According to an advantageous embodiment of the invention, a plurality of annular gap nozzle elements is formed by a stack of plates disposed parallel to one another in a coaxially stacked arrangement, as shown in FIGS. 6a to 6e and 7.

Figure 6A:
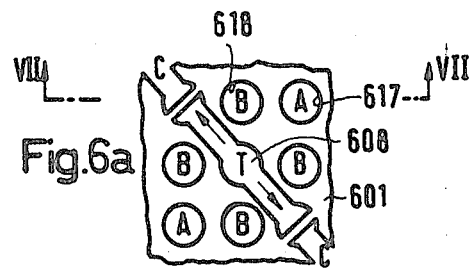
FIGS. 6a–e are plan views of portions of individual perforated discs and spacers which are stacked together to form a separating assembly.
Figure 6B:
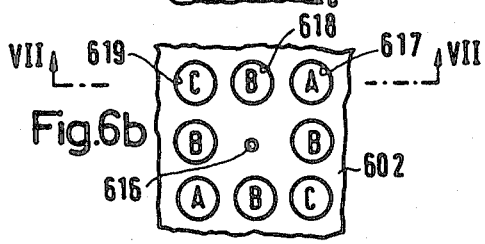
Figure 6C:
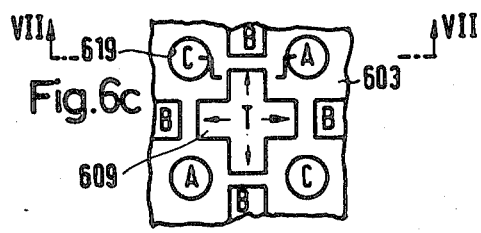
Figure 6D:
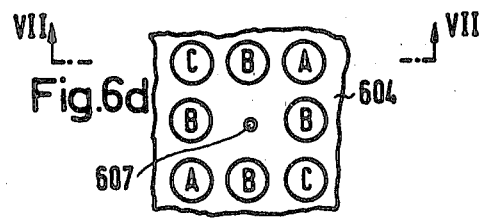
Figure 6E:
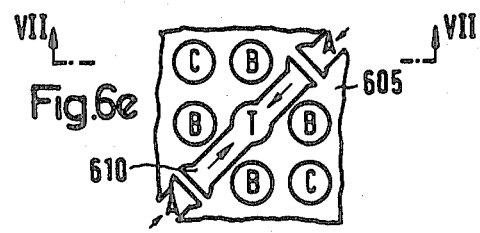

Each individual annular gap nozzle element is formed by two centrally perforated discs, or plates, 604, each provided with a bore 607, as shown in FIG. 6d and corresponding to discs 1 and 3 of FIG. 1, two centrally perforated discs, or plates, 602, each provided with a bore 616, as shown in FIG. 6b and corresponding to discs 5 and 7 in FIG. 1, a spacer plate 605, shown in FIG. 6e, two spacer plates 603, shown in FIG. 6c, and two spacer plates 601, shown in FIG. 6a. Each spacer plate 601 is located at a respective end of its associated gap nozzle element and those spacer plates 601 which are located within the stack are common to two adjacent gap nozzle elements.

It has been found to be advisable to supply the individual annular gap nozzle elements with the mixture stream A and to remove the various partial streams B and C through collecting channels 713, 714, 715 which are formed by aligned openings 617, 619, 618 in perforated plates 602 and 604, which have spacer plates 601, 603 and 605 interposed therebetween.

The connection between the collecting channels 713, 714 and 715 and the separating chamber T is established by recesses 608, 609 and 610 in spacer plates 601, 603 and 605, respectively. In FIGS. 6a-e, for reasons of clarity, the individual plates are shown separately, i.e. not stacked.

The stack is built in the sequence 601, 602, 603, 604, 605, 604, 603, 602, 601, etc. The various openings and passages are not shown to scale since the bore diameters to be selected and the widths of the recesses may differ by orders of magnitude and depend on the intended stack height.

The spacer plates 605, 603 and 601 are provided with recesses 610, 609 and 608 which extend beyond the aligned bores 607, 616 in such a way that those recesses lead to separate collecting channels 713, 715 and 714 for the supply of the streams of mixture A to be separated, the discharge of the lighter partial streams B and the discharge of the heavier partial streams C. The collecting channels extend parallel to the aligned bores 607, 616 through plates 602 and 604.

The streams of the mixture A to be separated flow through the collecting channels 713 to the diagonal recesses 610 in the spacer plates 605 and from there through bores 607 in the adjacent perforated plates 604. The lighter partial streams B are received by cross-shaped recesses 609 in spacer plates 603 and are sucked into the collecting channels 715. The heavier partial streams flow through the bores 616 of the perforated plates 602 into the diagonal recesses 608 of the spacer plates 601 and from there into the collecting channels 714. The recesses 608, 609, 610 are offset with respect to one another in such a way that no direct connection exists between collecting channels 713, 714, 715.

Due to the inverse proportionality of optimum operating pressure and characteristic dimensions on the one hand and the desire to employ as high an operating pressure as possible, on the other hand, a practical structure having the form shown having a diameter of the order of magnitude of only about $10\mu$. They are preferably formed by piercing, for example with electron beams or laser beams, preferably only after the plates have been stacked together. However, they can also be produced in another way, possibly together with formation of the frustoconical bulges shown in FIG. 2.

In contradistinction thereto the recesses 608, 609 and 610 and the openings 617, 618 and 619 which form the collecting channels 713, 715 and 714 have widths of the order of magnitude of 1 mm. They can be made with sufficient accuracy before stacking, for example by cutting, etching or electrolytic removal. Of course, all plates can also be produced by galvanoplastic methods or by other procedures employed, for example, in the printing art or in microelectronics.

Figure 7:
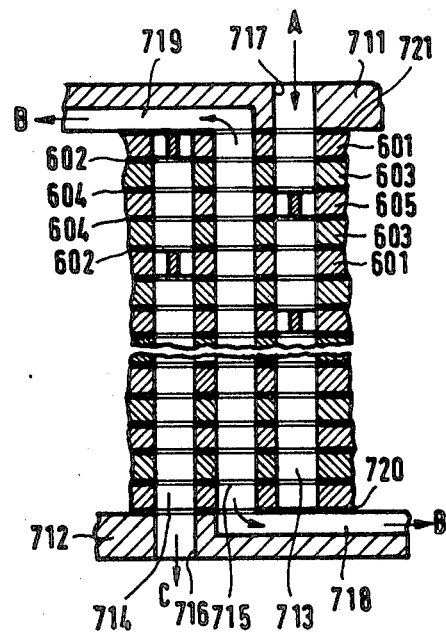
FIG. 7 is a schematic, longitudinal, axial, cross-sectional view of the gas stream intake and discharge portions of the stacked assembly of perforated discs and spacers of FIGS. 6a–e, taken along planes VII—VII of FIGS. 6a–6e.

FIG. 7 shows that an entire stack containing any desired number of annular gap nozzle elements, can be completed with two cover plates 711 and 712 and two thin covering discs 721 and 720. The supply of the streams of the mixture A to be separated are introduced through bores 717 in disc 711, the heavier partial streams C are extracted through bores 716 in disc 712 and the lighter partial streams B are discharged through conduits 718 and 719 in cover plates 712 and 711. These conduits 718 and 719 are perpendicular to the bores 716 and are formed by grooves in the cover plates 711 and 712, and by the covering discs 720 and 721 bordering these grooves. Disc 720 simultaneously forms the lower cover of the collecting channels 713, while disc 721 forms the upper cover of collecting channels 714. Otherwise, they are also provided with bores which permit the passage of streams A, B, C toward or away from the stack, respectively.

The association of the bores 716 and 717 and conduits 718 and 719 in cover plates 712 and 711 with the individual gas streams can of course also be selected in a different manner. Moreover, particularly with a division into more than two partial streams, further channels with other functions can also be accommodated in the cover plates.

EXAMPLE

The separation of uranium isotopes $U^{235}$ and $U^{238}$ was effected from a mixture A of 6 Mol percent $UF_6$ ($N_O=0.06$) and 94 Mol percent $H_2$ which was introduced into an annular gap nozzle element according to the invention having four perforated discs in the form shown in FIG. 2. The four perforated discs had central bores of a diameter of 2 mm each and were spaced 0.8 mm apart in the region of the openings. The pressure at the periphery of the disc-shaped area between the perforated discs was set at $P_O=3$ Torr. The pressure $P_O$ was measured at a distance of about 100 mm from the axis of the separating chamber.

The light partial streams $B_1$ and $B_2$ were expanded by the factor $P_O/P_L=1.5$ where $P_L$ was the pressure of the light partial streams, the heavy partial streams $C_1$ and $C_2$ by the factor $P_O/P_S=1.2$, where $P_S$ was the pressure of the heavy partial streams. As a result, the light partial streams produced $UF_6$ mole fractions of 3%, the heavy partial streams of 12%. The pressures $P_L$ and $P_S$ were measured at a distance of about 200 mm from the axis of the separating chamber.

The light partial streams $B_1$ and $B_2$ together amounted to 66.6% of the mixture A that had been introduced ($\theta_{tot}=0.666$); the quantity of $UF_6$ contained in the light partial streams $B_1$ and $B_2$ was 33.3% of the quantity of $UF_6$ contained in mixture A ($\theta_u=0.333$). The term $\theta_{tot}$ is defined as the ratio of the number of $UF_6$ and $H_2$ molecules withdrawn in the light stream to the number of the $UF_6$ and $H_2$ molecules fed into the separation element. The term $\theta_u$ is defined in like manner for the $UF_6$ molecules only.

The resulting elementary effect of the separation of the uranium isotopes was $\epsilon_A=8$ per mil. The separation effect $\epsilon_A$ is defined by the equation $$\epsilon_A = (n_L - n_S)/(n_S(1 - n_L))$$

wherein $N_L$, $n_S$ are the mole fraction of the light isotopic component 235-$UF_6$ in $UF_6$ in the light and heavy partial streams, respectively.

The cited data correspond to a specific ideal isothermal energy consumption $E_s$ of $0.786 \times 10^6$ RT, where R=the universal gas constant and T=absolute temperature, or computed for T=300° K., $E_S=2380$ kwh/kg UTA (SWU), where the calculation was made according to the following formula:

$$E_s = \frac{2RT}{\epsilon_A^2 \theta_u (1 - \theta_u) \cdot N_0} \left( \theta_{tot} \ln \frac{P_0}{P_L} + (1 - \theta_{tot}) \ln \frac{P_0}{P_S} \right)$$

The term SWU is called a separative work unit. It is defined for example in the report ORO 684, published by the USAEC Technical Information Center, P.O. Box 62, Oak Ridge, Tenn. 37830.

It will be understood that the above description of the present invention is susceptible to various modifications, changes and adaptations, and the same are intended to be comprehended within the meaning and range of equivalents of the appended claims.

What is claimed is:

1. In a method for separating a gaseous or vaporous mixture into components having different molecular weights and/or different gas kinetically effective cross sections by conducting the mixture through a nozzle into a separating chamber and deflecting the mixture in the chamber by mutual jet deflection, dividing the deflected mixture into partial streams having respectively different densities by means of at least one separating baffle which protrudes into the mixture flow path, and separately removing the partial streams, the improvement wherein said step of conducting is carried out by distributing the mixture substantially uniformly around the axis of the separating chamber and feeding the mixture into the chamber from all sides thereof in radial directions along a plane and said step of removing includes causing at least the lightest partial stream to flow radially out of the separating chamber substantially uniformly around the axis of the separating chamber and in a plane approximately parallel with the plane along which the mixture is fed into the separating chamber.

2. Method as defined in claim 1 be wherein said step of conducting is carried out by conducting the mixture through a plurality of separating elements each including a nozzle, a separating chamber and separating baffles, and said step of removing comprises causing individual heaviest partial streams of two adjacent elements to flow away from their associated separating elements and toward one another in the axial direction in such a manner that they mutually deflect one another in an axially symmetrical manner and flow radially out together substantially uniformly in all radial directions and approximately parallel to the plane along which the mixture is fed to each separating chamber.

3. Method as defined in claim 1 or 2 wherein said step of removing includes subjecting at least one heaviest partial stream to a higher outlet pressure than the lightest partial stream.

4. Method as defined in claim 3 wherein said step of removing includes subjecting at least one heaviest partial stream to an outlet pressure equal to or greater than the pressure to which the mixture is subjected at the inlet of the nozzle.

5. Method as defined in claim 1 or 2 wherein said step of dividing includes introducing a part of one partial stream into an adjacent lighter partial stream.

6. Method as defined in claim 1 or 2 comprising the preliminary step of adding a light gas to the mixture to be separated.

7. Method as defined in claim 6 wherein the light gas is added in a quantity presenting a large molar excess.

8. In apparatus for separating a gaseous or vaporous mixture into components having different molecular weights and/or different gas kinetically effective cross sections and including at least one nozzle element including a nozzle through which a stream of the mixture is conducted, a separating chamber which the mixture enters after passing through the nozzle and in which the mixture stream is deflected by mutual jet deflection, and at least one separating baffle which protrudes into the mixture flow path in the chamber for dividing the deflected mixture into partial streams having respectively different densities, and means for separately removing the partial streams, the improvement wherein said nozzle element comprises four aligned discs spaced from one another and each provided with a bore for passage of the mixture stream, the bores in said discs being in mutual alignment and delimiting said separating chamber, and means for distributing the mixture substantially uniformly around the axis of said separating chamber for enabling the mixture to be fed into said chamber from all sides thereof in radial directions along a plane, and said discs are arranged for causing at least the lightest partial stream to flow radially out of said separating chamber substantially uniformly around the axis of said separating chamber and in a plane approximately parallel with the plane along which the mixture is fed into said separating chamber.

9. An arrangement as defined in claim 8 wherein each of said discs has around its respective bore, the form of a conic frustum inclined toward the median plane of said separating chamber.

10. An arrangement as defined in claim 8 wherein there is a plurality of said nozzle elements each including four said discs, said nozzle elements being located coaxially relative to one another and being spaced axially apart to present a gap between successive elements.

11. An arrangement as defined in claim 10 wherein said discs of said plurality of nozzle elements are arranged in a stack coaxially on top of one another and parallel in juxtaposition to one another, and further comprising a plurality of spacer plates interposed between said discs, said discs and said plates being provided with aligned openings spaced laterally from said separating chambers and defining collecting channels for delivery of the mixture to, and removal of the partial streams from, said separating chambers, and said spacer plates are additionally provided with further openings placing said separating chambers in communication with said collecting channels.

12. An arrangement as defined in claim 11 further comprising two cover plates, each covering a respective end of said stack of discs and provided with bores aligned with said collecting channels and conduits extending perpendicular to at least one of said collecting channels.

* * * * *